(12) United States Patent
Fujita et al.

(10) Patent No.: US 7,489,610 B2
(45) Date of Patent: *Feb. 10, 2009

(54) HIGHLY ADAPTIVE RECORDING METHOD AND OPTICAL RECORDING APPARATUS

(75) Inventors: Shinji Fujita, Yokohama (JP); Takeshi Maeda, Koganei (JP); Manabu Shiozawa, Yokohama (JP); Takahiro Kurokawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/183,929

(22) Filed: Jul. 31, 2008

(65) Prior Publication Data

US 2008/0291796 A1 Nov. 27, 2008

Related U.S. Application Data

(63) Continuation of application No. 10/919,489, filed on Aug. 17, 2004.

(30) Foreign Application Priority Data

Sep. 16, 2003 (JP) ............................. 2003-322426

(51) Int. Cl.
*G11B 5/09* (2006.01)
(52) U.S. Cl. ................... 369/59.11; 369/59.12
(58) Field of Classification Search ........................ None
See application file for complete search history.

(56) References Cited

U.S. PATENT DOCUMENTS

| 5,241,524 A | 8/1993 | Lee |
| 5,490,126 A | 2/1996 | Furumiya et al. |
| 5,598,395 A | 1/1997 | Watanabe |
| 6,160,784 A | 12/2000 | Maeda et al. |

(Continued)

FOREIGN PATENT DOCUMENTS

JP 2000-90436 3/2000

(Continued)

OTHER PUBLICATIONS

Japanese Office Action, w/ partial English translation thereof, issued in Japanese Patent Application No. 2005-261561 dated on Oct. 21, 2008.

*Primary Examiner*—Joseph Feild
*Assistant Examiner*—Joseph Haley
(74) *Attorney, Agent, or Firm*—McDermott Will & Emery LLP

(57) ABSTRACT

An optical disk recording method includes the steps of: providing a multi-pulse chain from a recording wave; independently changing the pulse rise timing and pulse fall timing (pulse width) of the first pulse in the multi-pulse chain in accordance with a preceding space length and a recording mark length; changing the pulse rise timing and pulse fall timing (pulse width) in accordance with a following space length and the recording mark length in a predetermined timing or in independence; and in relation to the smallest mark recorded by irradiation with mono pulse, changing the rise timing in accordance with the preceding space length and the recording mark length and the fall timing (pulse width) in accordance with the following space length and recording mark length, compensating various optical disks different in recording material without change of the fundamental waveform.

3 Claims, 8 Drawing Sheets

| | RECORDING MARK LENGTH | | |
|---|---|---|---|
| | 2Tw | 3Tw | 4Tw OR LARGER |
| PRECEDING SPACE LENGTH 2Tw | a22 | a23 | a24 |
| 3Tw | a32 | a33 | a34 |
| 4Tw | a42 | a43 | a44 |
| 5Tw OR LARGER | a52 | a53 | a54 |

U.S. PATENT DOCUMENTS

| | | |
|---|---|---|
| 6,188,656 B1 | 2/2001 | Shoji et al. |
| 6,411,575 B1 | 6/2002 | Akiyama et al. |
| 6,631,110 B1 * | 10/2003 | Seo et al. ................. 369/59.12 |
| 6,894,965 B2 * | 5/2005 | Furumiya et al. ........ 369/59.12 |
| 2003/0021204 A1 | 1/2003 | Kashihara |

FOREIGN PATENT DOCUMENTS

| | | |
|---|---|---|
| JP | 2000-231719 A | 8/2000 |
| JP | 2002-319133 A | 10/2002 |

* cited by examiner

FIG. 5 Prior Art

| MODULATION METHOD | 1-7 MODULATION RLL (1, 7) | 2-10 MODULATION RLL (2, 10) |
|---|---|---|
| CONVERSION USER BIT n | 2 | 8 |
| CONVERSION CHANNEL BIT m | 3 | 16 |
| DETECTION WINDOW WIDTH Tw | 16ns | 12ns |
| MINIMUM FUNDAMENTAL FREQUENCY fmin | 3.87MHz | 3.75MHz |
| MAXIMUM FUNDAMENTAL FREQUENCY fmax | 15.5MHz | 13.6MHz |
| DATA PATTERN NUMBER | 7 | 9 |
| MINIMUM EDGE PITCH Tmin | 32ns | 36ns |
| MAXIMUM EDGE PITCH Tmax | 129ns | 133ns |
| CLOCK FREQUENCY fc | 61.9MHz | 82.5MHz |

FIG. 6

| | RECORDING MARK LENGTH | | |
|---|---|---|---|
| PRECEDING SPACE LENGTH | 2Tw | 3Tw | 4Tw OR LARGER |
| 2Tw | a22 | a23 | a24 |
| 3Tw | a32 | a33 | a34 |
| 4Tw | a42 | a43 | a44 |
| 5Tw OR LARGER | a52 | a53 | a54 |

FIG. 7

|  | RECORDING MARK LENGTH | |
|---|---|---|
|  | 3Tw | 4Tw OR LARGER |
| FOLLOWING SPACE LENGTH — 2Tw | a23 | a24 |
| 3Tw | a33 | a34 |
| 4Tw | a43 | a44 |
| 5Tw OR LARGER | a53 | a54 |

FIG. 8

|  | FOLLOWING SPACE LENGTH | | | |
|---|---|---|---|---|
|  | 2Tw | 3Tw | 4Tw | 5Tw OR LARGER |
| PRECEDING SPACE LENGTH — 2Tw | a22 | a23 | a24 | a25 |
| 3Tw | a32 | a33 | a34 | a35 |
| 4Tw | a42 | a43 | a44 | a45 |
| 5Tw OR LARGER | a52 | a53 | a54 | a55 |

FIG. 9

|  | RECORDING MARK LENGTH | | |
|---|---|---|---|
|  | 2Tw | 3Tw | 4Tw OR LARGER |
| FOLLOWING SPACE LENGTH — 2Tw | a22 | a23 | a24 |
| 3Tw | a32 | a33 | a34 |
| 4Tw | a42 | a43 | a44 |
| 5Tw OR LARGER | a52 | a53 | a54 |

HIGHLY ADAPTIVE RECORDING METHOD AND OPTICAL RECORDING APPARATUS

INCORPORATION BY REFERENCE

This application is a Continuation of U.S. application Ser. No. 10/919,489, filed Aug. 17, 2004 claiming priority of Japanese Application No. 2003-322426, filed Sep. 16, 2003, the entire contents of which are hereby incorporated by reference.

BACKGROUND OF THE INVENTION

1. Field of the Invention

The present invention relates to an optical disk for recording information by energy beam irradiation and particularly to an optical disk recording method having an excellent effect on various high-density recordable optical disks different in composition and recording mechanism, and an optical disk device using the recording method.

2. Description of the Related Art

A DVD-RAM using a phase change material for achieving a recording capacity of 4.7 GB per surface of a 120 mm-diameter disk has been put into practice in recent years. In the DVD-RAM, a recording film is provided with a first state (mark) and a second state (space). A predetermined repetitive pattern of the first state and the second state is formed to perform mark edge recording of information. A way of changing the level of irradiation power with the passage of time in the case where an energy beam is applied on the recording film to record information in the recording film is generally called recording strategy.

The recording strategy of the DVD-RAM is as shown in FIG. 2. The energy beam is pulsated so that the level of the energy beam changes among a first power level (recording power level Pw) for obtaining the first state, a second power level (bias power level Pb2) for obtaining the second state and a third power level (bias power level Pb1) lower than the first and second power levels. Particularly when a recording mark as the first state needs to be formed, the recording film is irradiated with a multi-pulse chain having light pulses of the first power level and light pulses of the third power level arranged alternately in accordance with the length of the recording mark in order to prevent the recording mark from being distorted geometrically.

Incidentally, if the distance between positions irradiated with two recording pulses adjacent to each other is relatively small compared with the light spot size of the energy beam applied on the recording film, there is a high possibility that both geometrical mark distortion and mark edge shift will occur because the light intensity distributions of the two recording pulses overlap each other. If the mark or space is too short, there is a high possibility that mark edge shift will occur in the waveform of a playback signal because the mark or space cannot be discriminated sufficiently on the basis of a playback light spot.

To solve the problem of mark edge shift, a correction technique has been disclosed and put into practice (e.g. see U.S. Pat. No. 5,490,126). In the correction technique, the aforementioned recording strategy based on a multi-pulse chain is used so that a light pulse of the first power level having a predetermined pulse width is applied particularly on each of leading and trailing portions of each mark, and that recording is performed while the positions of the leading and trailing portions of the mark are changed at any time in accordance with the respective lengths of the mark and preamble and following spaces to be recorded.

The way of generating the mark edge shift largely depends on the design of the recording film. A recording strategy adapted to a specific recording film is not always adapted to another recording film. Therefore, a correction technique using the recording strategy based on a multi-pulse chain has been disclosed and put into practice to cope with various recording films (U.S. Pat. No. 6,160,784). That is, one case is selected, in accordance with the disk, from a first case where the pulse rise timing of the first pulse applied on the leading portion of each mark is changed at any time in accordance with the recording mark length and preceding space length while the pulse fall timing of the first pulse is fixed and a second case where the pulse rise timing of the first pulse and the pulse fall timing of the first pulse are changed at any time in accordance with the recording mark length and preceding space length while the width of the first pulse is fixed. The last pulse applied on the trailing portion of each mark is generated in the same manner as the first pulse. That is, one case is selected, in accordance with the disk, from a first case where the pulse fall timing of the last pulse is changed at any time in accordance with the recording mark length and following space length while the pulse rise timing of the last pulse is fixed and a second case where the pulse rise timing of the last pulse and the pulse fall timing of the last pulse are changed at any time in accordance with the recording mark length and following space length while the width of the last pulse is fixed.

The density of an optical disk has kept on increasing recently with the advance of increase in quantity of data to be used. A DVD having a capacity of about 4.7 GB (gigabytes), inclusive of the aforementioned DVD-RAM, has generally come into wide use as against a CD having a capacity of about 700 MB (megabytes). A next-generation optical disk having a large capacity of 20 GB or more capable of recording high-definition images for 2 hours has been further developed and commercialized. In the next-generation optical disk, a semi-conductor laser with a short wavelength band of 405 nm (blue violet) is used as a light source and the numerical aperture of an objective lens is improved to 0.85. Moreover, the modulation code is changed from EFM-plus used in the DVD to 1-7 PP modulation. In expression in run length limited code, the modulation code used in the next-generation disk is RLL(1, 7) whereas the modulation code used in the DVD is RLL(2, 10). According to the change of the modulation code, the range of change of the mark/space length used in the next-generation disk is from 2 Tw to 8 Tw whereas the range of change of the mark/space length used in the DVD is from 3 Tw to 11 Tw when Tw is the width of a data detection window.

FIG. 5 shows various characteristics in each code in the case where the transfer time T is 24 ns per user bit. Since the smallest mark/space length has a tendency toward decreasing though the detection window width has a tendency toward increasing, there is a problem that the next-generation optical disk is different from the DVD-RAM in power levels and recording strategy necessary for recording an optimum mark. Moreover, since the smallest mark/space length is reduced relative to a playback light spot, there is a problem that mark edge shift becomes more remarkable because of reduction in resolving power.

The smallest mark length in a linear direction in the next-generation optical disk is 0.08 µm whereas the smallest mark length in a linear direction in the DVD-RAM is 0.28 µm. The next-generation optical disk has a structure in which adjacent marks/spaces are closer to each other physically. For this reason, there is a problem that thermal interference is easily caused by energy injected at the time of recording a mark. Particularly when a high-speed recordable recording medium will appear in the future, it is preferable that the recording medium can be used in a low-speed recording apparatus in terms of downward compatibility. It may be foreseen that the problem of thermal interference will become more serious because the high-speed recordable recording medium must have heat storage characteristic as a result of improvement in recording sensitivity. For this reason, there is a problem that mark edge shift at the time of recording becomes more remarkable.

SUMMARY OF THE INVENTION

It may be foreseen that higher accuracy than that in the conventional technique is required of the next-generation optical disk with respect to correction of mark edge shift.

It may be conceived that another material such as an organic coloring material used in a DVD-R than the phase change film used in the DVD-RAM is used as a recording medium in the next-generation optical disk. When the material of the recording film is changed, the mark-forming mechanism per se may be changed. It is however preferable that recording strategy can be adapted to various recording media when only numerical values of parameters are changed without use of recording waveforms different in accordance with the media, that is, without any change of a fundamental waveform. As for the aforementioned high-speed recordable medium, it is preferable that recording strategy can be adapted to the medium when only numerical values of parameters are changed without any change of the fundamental waveform between a high-speed recording mode and a low-speed recording mode. This is essential particularly to the case where data are recorded in the disk at a constant angular velocity (CAV).

In consideration of the aforementioned circumstances, an object of the invention is to provide an optical disk recording method and an optical disk device in which: a modulation code mark having a minimum mark/space length small relative to the width of a detection window can be recorded accurately on various recording media different in recording film material or recording mechanism and high-speed recordable media which will appear in the future when only numerical values of parameters are changed without any change of a fundamental waveform configuration; and it is possible to compensate particularly for mark edge shift caused by thermal interference at the time of recording and for mark edge shift caused by resolving power at the time of reproducing. Another object of the invention is to provide an optical disk which makes it easy to operate the optical disk recording method and the optical disk device.

To solve the aforementioned problem, the optical disk recording method, the optical disk device and the optical disk according to the invention are configured as follows.

There is provided an optical disk recording method used for an optical disk having a recording film capable of being changed to an optically different state by irradiation with an energy beam to thereby record information, the method being provided for recording information as a recording mark length and (preceding and following) space lengths (mark distance) in the optically different state by irradiating the recording film with a multi-pulse chain of the energy beam having at least two emission power levels each having an emission time changed in accordance with the optical disk while relatively moving the energy beam in a surface of the recording film of the optical disk, wherein information is recorded while the position and width of the first pulse in the multi-pulse chain of the energy beam are changed suitably independently in accordance with the recording mark length and the preceding space length. In addition to this configuration, in the optical disk recording method, information may be recorded while the position and/or width of the last pulse in the multi-pulse chain are changed suitably in accordance with the recording mark length and the following space length.

In the optical disk recording method, a mono pulse is used for recording the shortest mark so that information is recorded while the position and width of the mono pulse are changed suitably in accordance with the preceding space length and the following space length. Or in the optical disk recording method, information is recorded while the pulse rise position of the mono pulse is changed suitably in accordance with the preceding space length and the pulse fall position of the mono pulse is changed suitably in accordance with the following space length.

There is also provided an optical disk device having an energy beam generator, a power adjusting unit by which emission power of an energy beam generated by the energy beam generator can be set to have at least two predetermined power levels, a holding mechanism for holding an optical disk having a recording film capable of being changed to an optically different state by irradiation with the energy beam having the predetermined power levels to thereby record information, a moving unit by which the energy beam can be relatively moved in a surface of the recording film of the optical disk, and a conversion unit for converting information to be recorded into a power level change of the energy beam, wherein: the optical disk device further has a storage unit for storing values of settings concerning energy beam emission control; the storage unit includes at least two reference tables on which the position and width of the first pulse in the multi-pulse chain are defined on the basis of the recording mark length and the preceding space length; and the power adjusting mechanism performs emission pulse timing control while referring to the tables. In addition to this configuration, the storage unit further includes at least one reference table on which the position and/or width of the last pulse in the multi-pulse chain are defined on the basis of the recording mark length and the following space length; and the power adjusting mechanism performs emission pulse timing control while referring to the tables.

In the optical disk device, the storage unit may further include at least two reference tables on which the position and width of the mono pulse are defined on the basis of the preceding space length and the following space length; and the power adjusting mechanism performs emission pulse timing control while referring to the tables.

Or in the optical disk device, the power adjusting mechanism may perform emission pulse timing control on the basis of the pulse rise timing of the mono pulse decided by referring to the reference table concerning the position or width of the first pulse and the pulse fall timing of the mono pulse decided by referring to the reference table concerning the position or width of the last pulse.

The optical disk may be configured so that each of the reference tables holds values of coefficients expressed as integers in a definitional equation for defining the position or width of each pulse. Particularly, the position and/or width of each pulse are expressed as the sum of a linear term and a nonlinear term with respect to twofold increase in recording velocity. The coefficient of the linear term is held or the difference of the coefficient of the linear term from a predetermined value is held.

There is further provided an optical disk which is configured so that the reference tables are partially or wholly recorded in a predetermined position of the disk in advance.

There is further provided an information recording method for recording information by irradiating an information recording medium with an energy beam, wherein: a recording mark is formed by irradiating the information recording medium with at least first and last pulses in a multi-pulse chain obtained by changing power of the energy beam pulsatively; and information is recorded on the information recording medium on the basis of one case selected from cases 1 to 8:

case 1 where TLFP is changed while TEFP is fixed and where TLLP is changed while TSLP is fixed;

case 2 where TEFP is changed while TLFP is fixed and where TLLP is changed while TSLP is fixed;

case 3 where TLFP is changed while TEFP is fixed and where TSLP is changed while TLLP is fixed;

case 4 where TFFP is changed while TLFP is fixed and where TSLP is changed while TLLP is fixed;

case 5 where TLFP is changed while TEFP is fixed;

case 6 where TEFP is changed while TLFP is fixed;

case 7 where TLLP is changed while TSLP is fixed; and case 8 where TSLP is changed while TLLP is fixed;

when TLFP is the irradiation time of the first pulse, TEFP is the amount of displacement of the pulse fall timing of the first pulse from a reference time point, TLLP is the irradiation time of the last pulse, and TSLP is the amount of displacement of the pulse rise timing of the last pulse from a reference time point.

Incidentally, in the optical disk recording method and the optical disk device according to the invention, a modulation code mark small in the minimum mark/space length relative to the detection window width can be recorded accurately on various recording media different in recording film material or recording mechanism or on high-speed recordable media which will appear in the future, when numerical values of parameters are changed without any change in configuration of the fundamental waveform. Particularly, it is possible to compensate for mark edge shift caused by thermal interference at the time of recording and mark edge shift caused by resolving power at the time of reproducing. In the optical disk according to the invention, it is possible to operate the optical disk recording method and the optical disk device easily.

Other objects, features and advantages of the invention will become apparent from the following description of the embodiments of the invention taken in conjunction with the accompanying drawings.

BRIEF DESCRIPTION OF THE DRAWINGS

FIG. 5 is a table for comparing the two modulation methods RLL(1, 7) and RLL(2, 10) in the case where transfer time T is set to be 24 ns per user bit;

FIG. 6 is a table for illustrating a reference table of parameters concerning the first pulse in the first embodiment depicted in FIG. 1;

FIG. 7 is a table for illustrating a reference table of parameters concerning the last pulse in the first embodiment depicted in FIG. 1;

FIG. 8 is a table for illustrating a reference table of parameters concerning a recording pulse of 2 Tw in a second embodiment of the invention;

FIG. 9 is a table for illustrating a reference table of parameters concerning the last pulse in the third embodiment of the invention;

DETAILED DESCRIPTION OF THE EMBODIMENTS

First and second embodiments of the invention will be described below with reference to the drawings.

Figure 4:
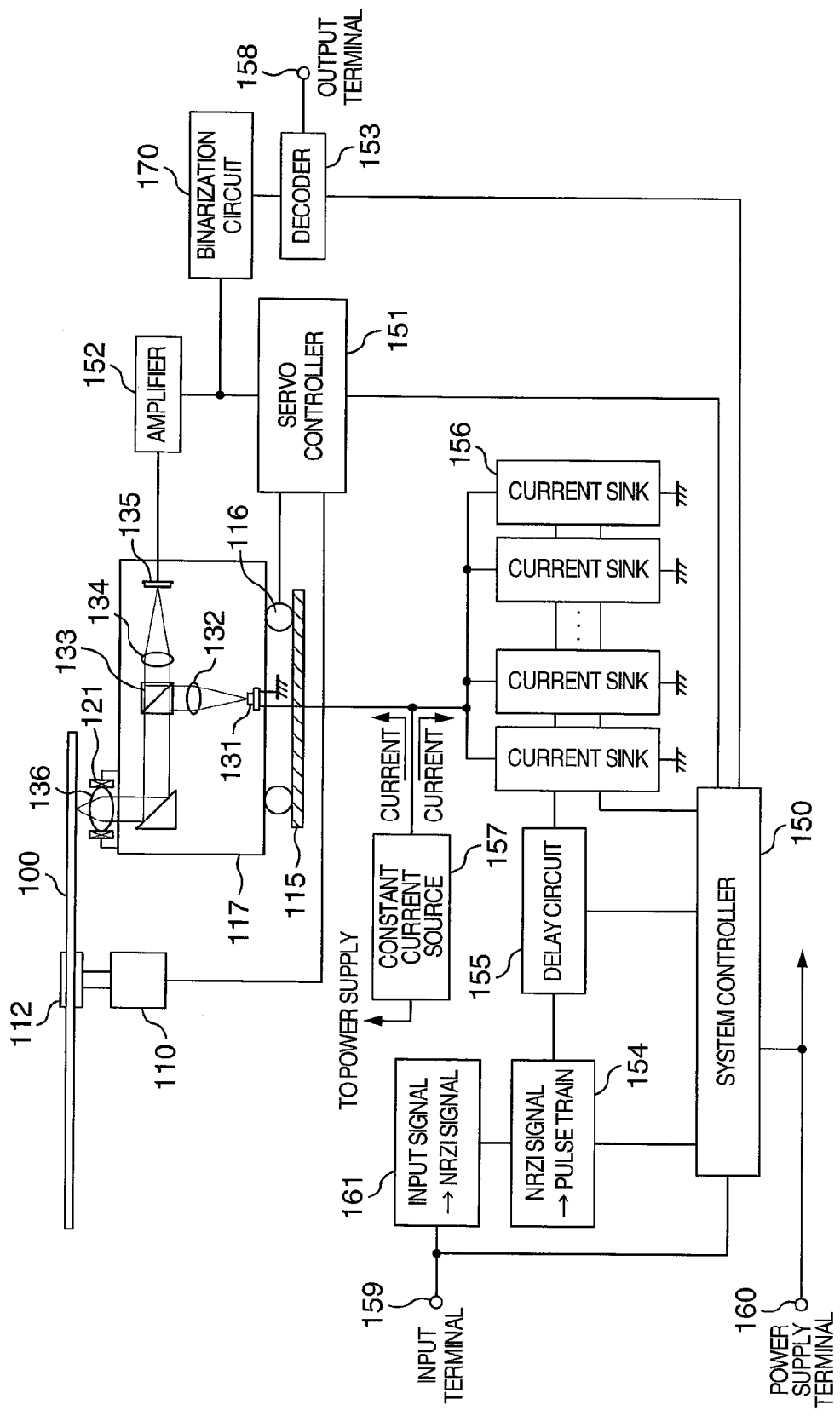
FIG. 4 is a block diagram showing a specific example of an optical disk device according to the invention.

FIG. 4 shows an optical disk device according to the invention. In FIG. 4, the reference numeral 100 designates an optical disk; 110, a spindle motor; 112, a chucking mechanism; 115, a guide rail; 116, a feed motor; 117, an optical pickup; 121, an objective lens actuator; 131, a semiconductor laser; 132, a collimator lens; 133, a beam splitter; 134, a detection lens; 135, a photo detector; 136, an objective lens; 150, a system controller; 151, a servo controller; 152, an amplifier; 153, a decoder; 154, a signal processing circuit; 155, a delay circuit; 156, current sinks; 157, a constant current source; 158, an output terminal; 159, an input terminal; 160, a power supply terminal; 161, a signal processing circuit; and 170, a binarization circuit.

An optical disk recording method according to a first embodiment of the invention will be described.

Figure 1:
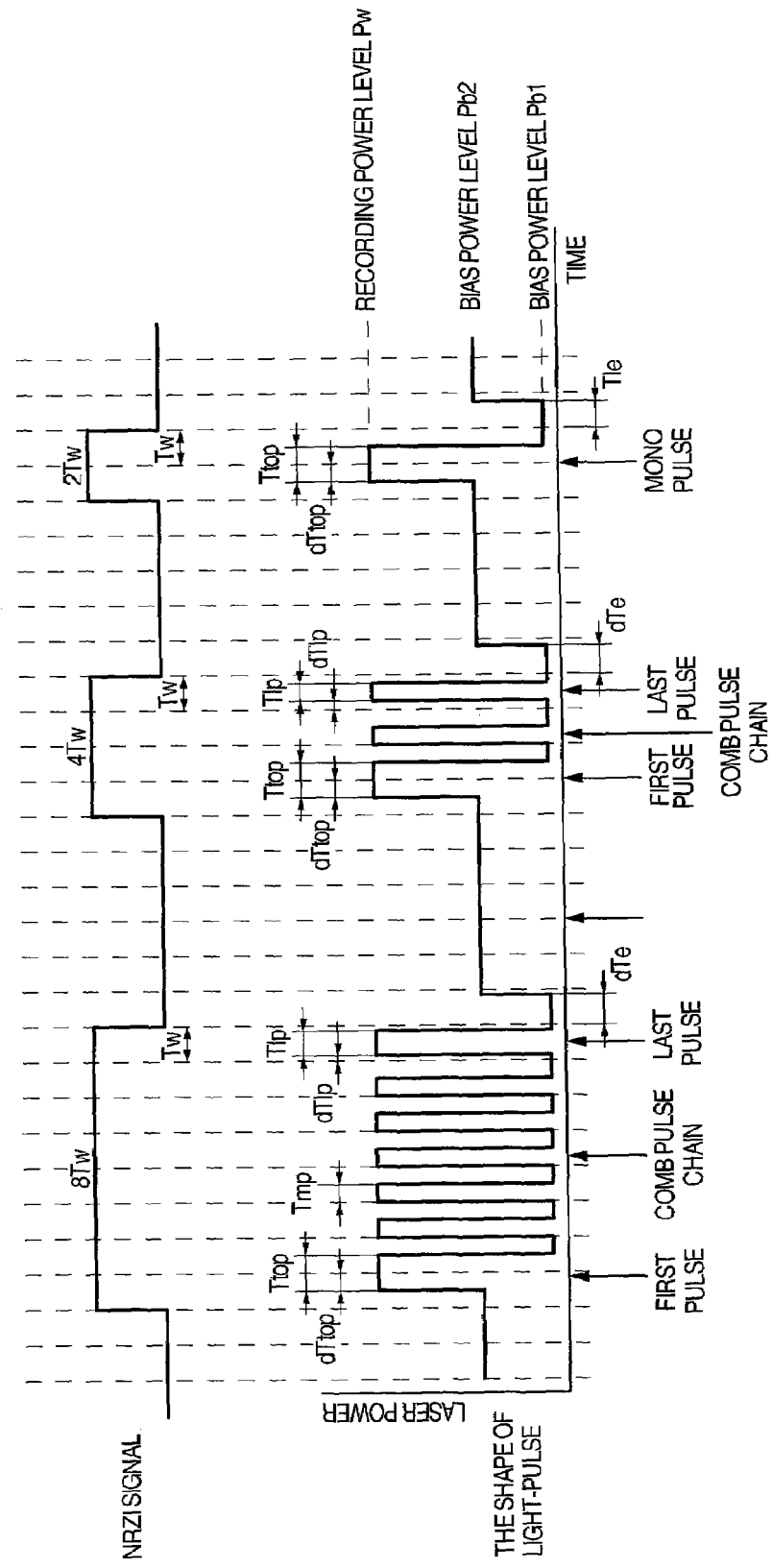
FIG. 1 is an explanatory view showing a recording strategy corresponding to modulation of RLL(1, 7), in an optical disk recording method according to a first embodiment of the invention.
Figure 2:
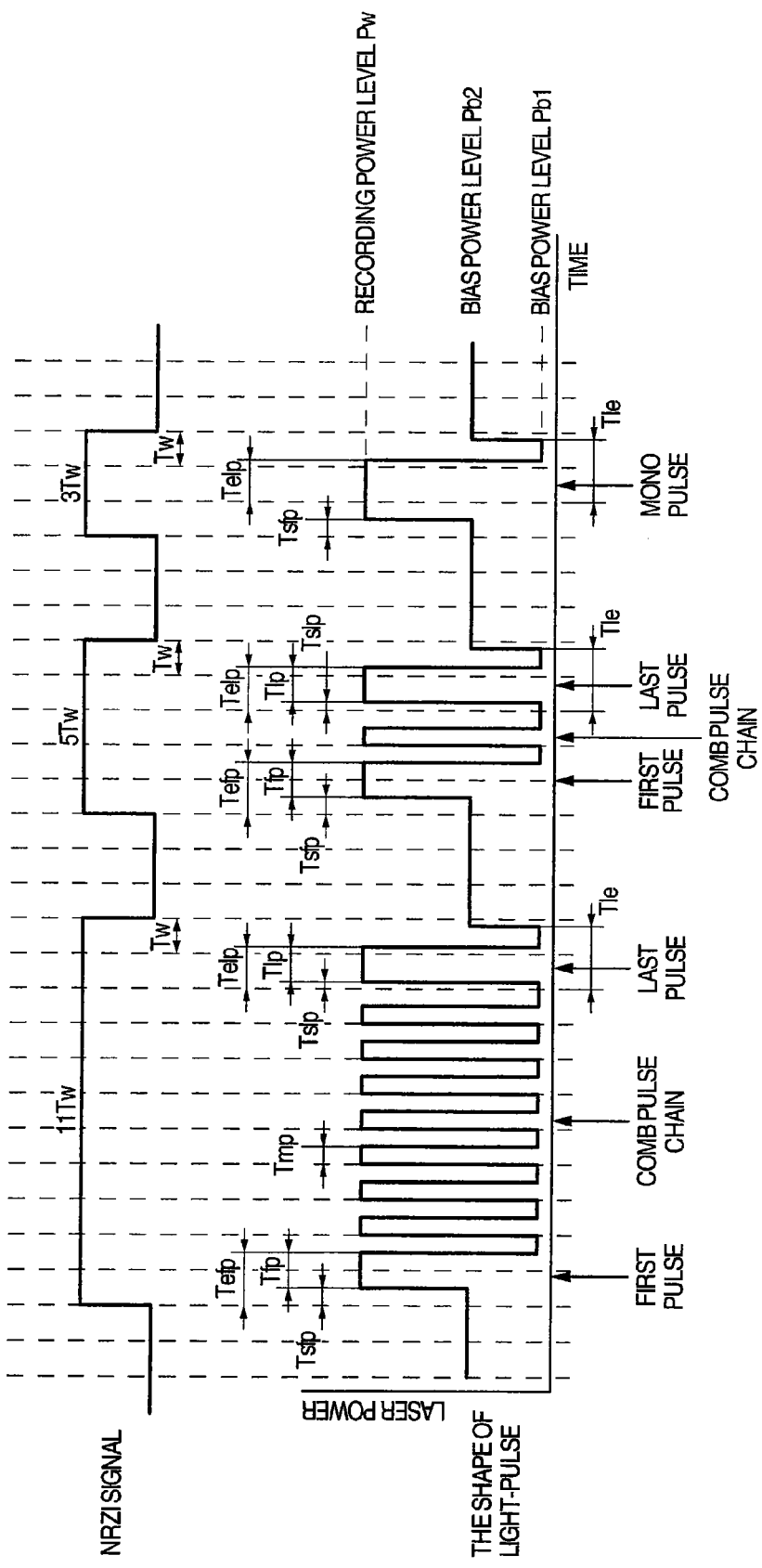
FIG. 2 is an explanatory view showing a recording strategy corresponding to modulation of RLL(2, 10), in a conventional optical disk recording method.

FIG. 1 shows a recording strategy in the optical disk recording method according to the invention. In this embodiment, there is shown the case where information is recorded after converted into RLL(1, 7) as a modulation code. When Tw is the time width (detection window width) of a reference clock pulse for recording and reproducing data, the smallest mark or space length is 2 Tw (twice as large as the time Tw) and the largest mark or space length is generally 8 Tw.

When an NRZI signal expressing time-series information to be recorded in the optical disk is given, the NRZI signal is converted into a time-series energy beam power level change, that is, an emission pulse waveform by a suitable signal processing circuit.

Three power levels, namely, a recording power level Pw, a first bias power level Pb1 and a second bias power level Pb2, are set on the assumption that a rewritable phase change material having good overwrite characteristic is used as the material of a recording film. The state of the recording film can be shifted reversibly so that the recording film gets into a first state (mark in this embodiment) when the recording film is irradiated with an energy beam of the recording power level Pw, and that the recording film gets into a second state (space in this embodiment) when the recording film is irradiated with an energy beam of the second bias power level Pb2. The first bias power level Pb1 is equal to or lower than the second bias power level Pb2.

When the length of a mark (region of the first state) to be formed in the recording film is not smaller than 3 Tw (i.e. the length of the NRZI signal is not smaller than 3 Tw), a period of the first bias power level Pb1 is mixed with an irradiation period of the recording power level Pw so that the energy beam can be provided in the form of a multi-pulse chain. In the multi-pulse chain of the energy beam, a light pulse generated first is called first pulse, and a light pulse generated last is called last pulse. Repeated light pulses which come and go between the recording power level Pw and the first bias power level Pb1 are provided between the first pulse and the last pulse in accordance with the length of the NRZI signal. The number of repetitions is (n−3) when nTw (n>4) is the length of the NRZI signal. The repeated pulses provided between the first and last pulses are generically referred to as comb pulse chain.

Collectively, the total number of light pulses to be generated for forming a mark corresponding to the NRZI signal having a length of nTw is (n−1). Particularly, when a mark corresponding to the NRZI signal having a length not smaller than 4 Tw needs to be formed, a first pulse, a comb pulse chain and a last pulse are generated as recording pulses. When a mark corresponding to the NRZI signal having a length of 3 Tw needs to be formed, a first pulse and a last pulse are generated as recording pulses. When a mark corresponding to the NRZI signal having a length of 2 Tw needs to be formed, a mono pulse is generated as a recording pulse.

When the length of the NRZI signal is not smaller than 3 Tw, the energy beam is kept at the first bias power level Pb1 for a predetermined time after the last pulse is generated. When the length of the NRZI signal is 2 Tw, the energy beam is kept at the first bias power level Pb1 for a predetermined time after the recording pulse is generated.

Incidentally, when an optical disk having a recording film made of another material such as an organic coloring material than the phase change material is used, the state of the recording film cannot be shifted from the first state to the second state even in the case where the recording film is irradiated with an energy beam of the second bias power level Pb2. In this case, there may be used a recording strategy in which only two power levels, namely, a recording power level Pw and a first bias power level Pb1 are set.

Use of a non-recordable bias power level, however, may permit improvement in recording characteristic. For example, if the output of the energy beam is particularly limited at the time of high-speed recording, it may be impossible to sufficiently increase the temperature of the recording film by pulse irradiation of the recording power level Pw. Recording is however enabled easily when the bias power level is used for preheating the recording film before recording in order to assist the temperature rise at the time of recording. Accordingly, the recording strategy having the three power levels as shown in FIG. 1 can be also used for a recordable optical disk having the state changing irreversibly.

Next, definitions of time points (positions) and irradiation time periods (widths) of the first and last pulses in this embodiment will be described. The pulse rise time point of the first pulse is defined as a time point which is a displacement time period dTtop ahead of a reference time point which is 1 Tw after the rise time point of the NRZI signal. Incidentally, in the case where the first pulse rises when a displacement time period dTtop has passed after the reference time point, the pulse rise time point of the first pulse is regarded as having a negative value. The irradiation time period Ttop of the first pulse is defined as a time period between the pulse rise time point of the first pulse and the pulse fall time point of the first pulse. On the other hand, the pulse rise time point of the last pulse is defined as a time point which is a displacement time period dTlp ahead of a reference time point which is 1 Tw ahead of the fall time point of the NRZI signal. Incidentally, in the case where the last pulse rises when a displacement time period dTlp has passed after the reference time point, the pulse rise time point of the last pulse is regarded as having a negative value. The irradiation time period Tlp of the last pulse is defined as a time period between the pulse rise time of the last pulse and the pulse fall time point of the last pulse.

In this embodiment, the recording pulse of 2 Tw is defined in accordance with the definition of the first pulse.

The comb pulse chain is formed so that each pulse rises at a time point corresponding to a reference clock position and falls at a time point which is a time period Tmp after the pulse rise time point.

The irradiation time point of the first bias power level after the last pulse is defined as a time point which is a displacement time period dTe ahead of the fall time point of the NRZI signal as a reference time point. Incidentally, the first bias power level rises when a displacement time period dTe has passed after the reference time point, the irradiation time point is regarded as having a negative value.

In this embodiment, each of the values of dTtop, Ttop, dTlp, Tlp, Tmp and dTe is defined by the sum of a linear term and a nonlinear term with respect to the reference clock Tw. For example, dTtop is defined as follows:

$$dTtop = a \cdot Tw/n + b \cdot t$$

in which n is a predetermined integer, Tw/n is pulse resolving power, t is a predetermined time independent of Tw, and a and b are coefficients for the respective terms. In this embodiment, the coefficients a and b are integers.

Incidentally, the invention is not limited thereto. For example, each parameter may be defined only by the linear term with respect to the reference clock Tw or may be defined only by the nonlinear term, conversely. The parameters may include parameters each defined by the sum of the linear term and the nonlinear term may be mixed, and parameters each defined only by the linear term.

Incidentally, each of dTtop, Ttop, dTlp, Tlp, Tmp and dTe for defining the recording pulse timing does not always take a constant value.

To compensate for mark edge shift caused by thermal interference between adjacent marks at the time of recording data and shortage of resolving power at the time of reproducing data, for example, in the DVD-RAM or the like, parameters for defining the pulse rise time point of the first pulse and the pulse fall time point of the last pulse were often changed adaptively in accordance with the combination of NRZI signals though the definitions of pulse timing were not always the same as in this embodiment. Particularly, the first pulse was often translated in the direction of the time axis without any change of the irradiation time period or the pulse rise time point of the first pulse was often changed while the pulse fall time point was fixed. Similarly, the last pulse was often translated without any change of the irradiation time point or the pulse fall time point of the last pulse was often changed while the pulse rise time point was fixed.

As described above, particularly in a next-generation optical disk which is assumed in the invention and in which the smallest mark/space length will be 0.1 μm or smaller, it is however difficult to record data always stably because thermal interference between adjacent marks becomes more intensive at the time of recording data. Particularly in the recordable recording film, front edge shift of the mark caused by the difference in preceding space length is remarkable because the recordable recording film has characteristic that the recording film is easily affected by thermal interference.

Also in the next-generation optical disk which is assumed in the invention and in which the smallest mark/space length will be 2 Tw, deterioration of reproducing performance caused by mark edge shift of a playback signal becomes remarkable because resolving power of playback light spots is reduced at the time of reproducing data. It was often impossible to perform sufficient correction by the conventional method.

Therefore, in this embodiment, a reference table of dTtop and a reference table of Ttop are defined independently as shown in FIG. 6 particularly to correct remarkable front edge shift. As a result, the recording mark length and the preceding space length can be combined with each other so that the position and width of the first pulse can be defined freely. Accurate edge shift correction can be made on the next-generation optical disk larger in interference, so that recording/reproducing performance can be improved.

Particularly in this embodiment, a reference table concerning the coefficient (coefficient a in the aforementioned example of dTtop) of the linear term with respect to Tw in each parameter is defined. Since the coefficient is an integer, there is a merit that the quantity of information to be recorded can be suppressed, and that it is easy to cope with the situation that Tw changes according to a plurality of recording speeds at the time of recording data at a constant angular velocity (CAV).

Or a reference value of each parameter may be defined in advance so that the amount of displacement from the reference value can be registered in each reference table. For example, a reference table of dTtop may be defined as follows. First, dTtop is defined again by the following expression:

$$dTtop = (a0 + \Delta a)Tw/n + b \cdot t$$

in which a0 is a reference value (integer), and Δa is a displacement amount (integer). Then, the reference table is defined with respect to Δa.

As for the rear edge shift, a reference table of dTlp or a reference table of Tlp is defined as shown in FIG. 7. Or configuration may be made so that one of the reference table of dTlp and the reference table of Tlp can be switched, for example, in accordance with the difference in the recording film material of the optical disk. Particularly in the recordable recording film made of an organic coloring material, correction control of the rear edge need not be performed accurately because the recording film has characteristic that the recording film is little affected by the difference in following space length. When the same rear edge correction as in the conventional technique is however performed, sufficient rear edge shift correction can be made on the phase change recording medium assumed in this embodiment.

Incidentally, the reference table concerning dTlp and the reference table concerning Tlp may be defined independently in the same manner as in the first pulse. In this case, the number of variables in recording strategy increases but the position and width of the last pulse waveform can be defined freely.

In this embodiment, as a reference table concerning the first pulse, there is provided a 4×3 reference table on which the preceding space length is classified into four groups, namely, 2 Tw, 3 Tw, 4 Tw and 5 Tw or larger and on which the recording mark length is classified into three groups, namely, 2 Tw, 3 Tw and 4 Tw or larger, as shown in FIG. 6. As a reference table concerning the last pulse, there is provided a 4×2 reference table on which the following space length is classified into four groups, namely, 2 Tw, 3 Tw, 4 Tw and 5 Tw or larger and on which the recording mark length is classified into two groups, namely, 3 Tw and 4 Tw or larger, as shown in FIG. 7. It is however a matter of course that the invention is not limited thereto, and that the size of each reference table may be defined desirably in consideration of the degree of dependence on the space length and recording mark length and the correction effect.

Although this embodiment has been described on the case where timing of each pulse is defined by the pulse rise time point and irradiation time period of the pulse, the invention does not depend on the way of defining timing of each pulse. For example, timing of each pulse may be defined by the pulse rise time point and the pulse fall time point, by the pulse fall time point and irradiation time period of the pulse, or by the irradiation time period and central time point of the irradiation time.

According to the invention, accurate mark edge compensation can be made when reference tables shown in this embodiment are provided. Accordingly, various optical disks different in recording film material or recording mechanism can be used when only pulse timing parameters including the power levels and the reference tables are changed without any change of the fundamental waveform.

The optical disk recording method as a second embodiment of the invention will be described below.

In this embodiment, the time point (position) and irradiation time period (width) of a recording pulse of 2 Tw are defined independent of the pulse chain of 3 Tw or larger. That is, let dTop2 be the pulse rise position of the recording pulse and let Ttop2 be the irradiation time period of the recording pulse. With respect to dTtop2 and Ttop2, a reference table as shown in FIG. 8 is defined independently in accordance with the combination of the preceding space length and the following space length. Incidentally, a reference table of dTop and Ttop is defined on the basis of the recording mark length of 3 Tw or larger.

When the recording pulse of 2 Tw is defined by the combination of the preceding space length and the following space length as described above, dependence of rear edge shift of a 2 Tw mark on the following space length can be compensated though the dependence cannot be compensated in the first embodiment. The other configuration of the second embodiment is the same as that of the first embodiment. Accordingly, description of the other configuration and function will be omitted.

The optical disk recording method as a third embodiment of the invention will be described below.

Figure 3:
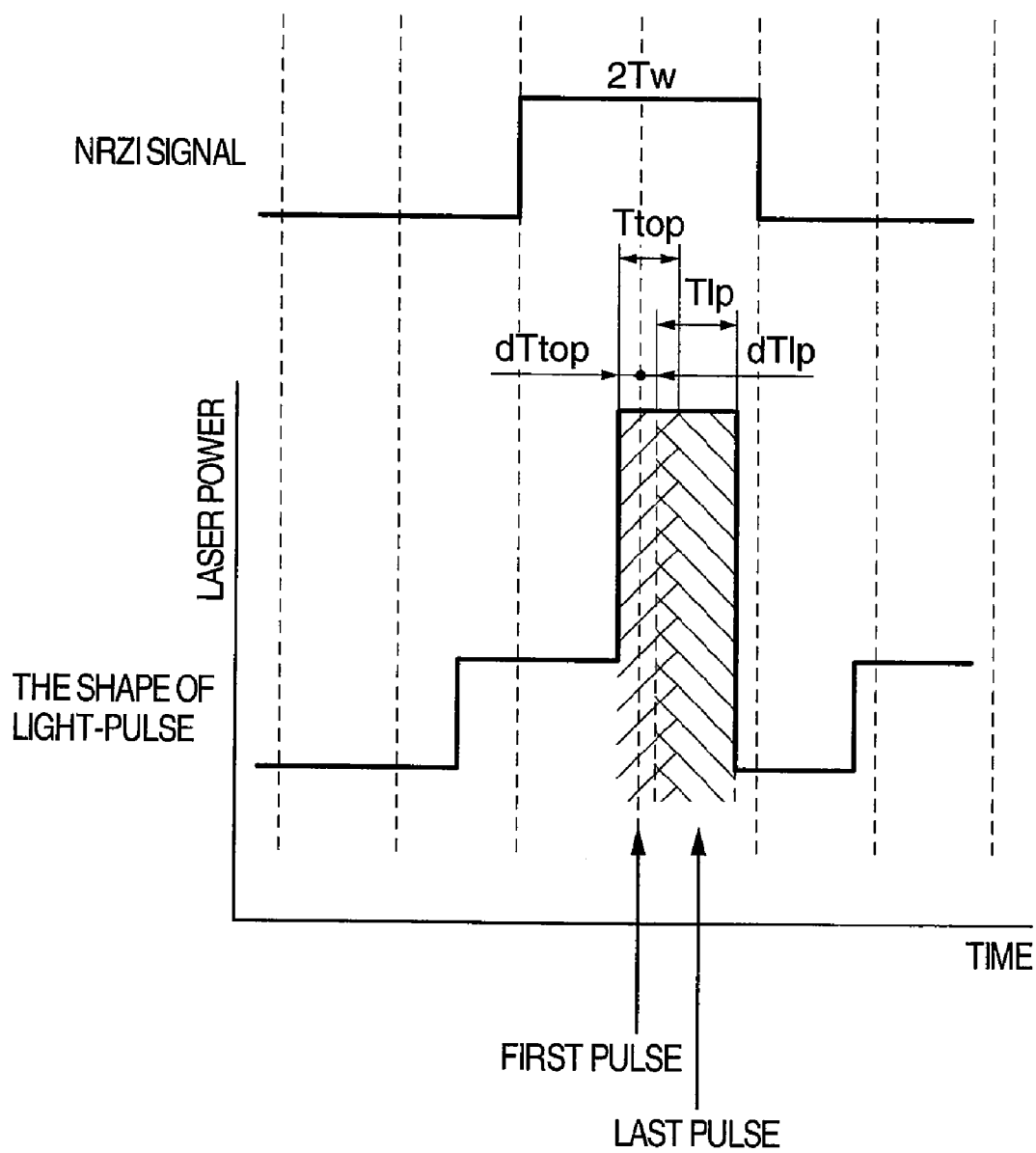
FIG. 3 is an explanatory view showing a recording pulse of 2 Tw in the optical disk recording method according to a third embodiment of the invention.

In this embodiment, parameters are defined in the condition that the recording pulse of 2 Tw is regarded as a superposition of the first pulse and the last pulse as shown in FIG. 3. That is, the pulse rise time point of the recording pulse of 2 Tw is defined on the basis of the time point (position) dTtop of the first pulse, and the pulse fall time point is defined on the basis of the irradiation time period (width) Tlp of the last pulse.

The irradiation time period (width) Ttop of the first pulse and the time point (position) dTlp of the last pulse are set as specific values in accordance with the recording disk. Incidentally, the parameters are defined so that the first pulse does not exceed the rear edge and the last pulse does not exceed the front edge, and that the first pulse and the last pulse are not separated as two pulses.

Or the parameters are defined so that the irradiation time period of the first pulse is always set to be equal to the irradiation time period of the last pulse, and that the pulse rise time point of the last pulse is always set to be equal to the pulse rise time point of the first pulse. That is, while the first pulse and the last pulse are made coincident with each other, the pulse rise time point of the combined pulse is changed in accordance with the preceding space length and the pulse fall time point of the combined pulse is changed in accordance with the following space length.

With respect to a reference table of dTlp and Tlp for defining the last pulse, as shown in FIG. 9, the recording mark length is classified into three groups inclusive of the recording mark length of 2 Tw. The other configuration of the third embodiment is the same as that of the first embodiment. Accordingly, description of the other configuration and function will be omitted.

When the recording pulse of 2 Tw is defined as a superposition of the first pulse and the last pulse as described above, the dependence of rear edge shift of the 2 Tw mark on the following space length can be compensated without increase in the number of reference tables as required in the second embodiment. Incidentally, there is an effect that the recording pulse of 2 Tw can be handled so as to be unified with the multi-pulse chain of 3 Tw or larger.

An optical disk device and an optical disk as a fourth embodiment of the invention will be described below with reference to the drawings.

FIG. 4 is a block diagram of an optical disk device according to the invention. A removable optical disk 100 is held by a chucking mechanism 112 provided in a spindle motor 110. When the spindle motor 110 is driven, the optical disk 100 rotates so that the position of the optical disk 100 is moved relative to an energy beam emitted from an optical pickup 117. When a feed motor 116 is driven, the optical pickup 117 can move linearly along a guide rail 115 substantially in a radial direction of the optical disk 100.

The optical pickup 117 is provided with a semiconductor laser 131 which serves as an energy beam generator. An energy beam emitted from the semiconductor laser 131 is transmitted through a collimator lens 132 and a beam splitter 133 and converged by an objective lens 136. The objective lens 136 is held by an objective lens actuator 121 so that the objective lens 136 can be displaced or positioned both in a direction (focusing direction) perpendicular to a recording surface of the optical disk 100 and in a radial direction (tracking direction) of the disk. Accordingly, the energy beam can be converged into a predetermined position of the optical disk 100.

Part of the energy beam converged on the recording surface of the optical disk 100 is reflected and transmitted through the objective lens 136 again. Then, the part of the energy beam is reflected on the beam splitter 133 and converged by a detection lens 134, so that the light intensity of the energy beam is detected by a photo detector 135. A light-receiving region of the photo detector 135 is separated into a plurality of light-receiving regions. The light intensity detected by each light-receiving region is amplified by an amplifier 152 and subjected to an arithmetic operation. As a result, information (a servo signal) concerning the position of the optical disk 100 relative to a light spot converged by the objective lens 136 and an information playback signal are detected. The servo signal is sent to a servo controller 151. The playback signal is sent to a decoder 153.

When the optical disk 100 mounted in the optical disk device is fixed by the chucking mechanism 112, a detector 140 operates so that a signal detected by the detector 140 is sent to a system controller 150. Upon reception of the signal, the system controller 150 controls the spindle motor 110 to rotate the optical disk 100 at a predetermined rotational velocity. The system controller 150 further controls the feed motor 116 to locate the optical pickup 117 in a predetermined position. The system controller 150 further controls the semiconductor laser 131 to emit light and controls the feed motor 116 through the servo controller 151 to drive the objective lens actuator 121 so that the focal spot formed by the objective lens 136 is aligned with the predetermined position of the optical disk 100. Then, the servo controller 151 generates a signal indicating the fact that the focal spot is formed on the recording surface of the optical disk 100, and sends the signal to the system controller 150. The system controller 150 operates the decoder 153 to decode the playback signal. When a reproduced track is not an information track in a control zone, the system controller 150 operates the servo controller 151 so that the focal spot is positioned on an information track in a control zone. As a result of the aforementioned operation, the system controller 150 reproduces the information track in a control zone of the optical disk 100 and reads disk information concerning recording.

The optical disk 100 is an optical disk according to the invention. Disk information concerning recording is recorded on the information track in the control zone in advance. That is, parameters in recording strategy shown in FIG. 1 and reference tables as described above in the first to third embodiments are recorded as the disk information. If necessary, flags indicating reference table types (as to whether values on each table are coefficients or differences) may be further recorded as the disk information. In this embodiment, the optical disk can be operated easily on the basis of the disk information.

The system controller 150 reads the information concerning recording, that is, information concerning recording power levels, time relations of recording pulses, reference tables and flags and writes the information in a parameter table of a signal processing circuit 154, a parameter table of a delay circuit 155 and current sink amount parameters of current sinks 156. Particularly, the delay circuit 155 or the combination of the delay circuit 155 and the signal processing circuit 154 serves as a storage unit for storing reference tables in the invention.

Incidentally, the processes in which the system controller 150 reads parameters of recording strategy of the optical disk 100 and writes the parameters in the parameter table of the signal processing circuit 154, the parameter table of the delay circuit 155 and the current sink amount parameters of the current sinks 156 may be performed only in the case where the optical disk 100 is write-enabled. That is, these processes may be dispensed with in the case where the optical disk 100 is write-disabled.

When an information playback command is given from an upper controller through an input connector 159, the system controller 150 instructs the servo controller 151 to locate the focal spot on an appropriate position of the optical disk 100. After the playback signal obtained by the photo detector 135 is decoded, the playback information is sent to the upper controller through an output connector 158.

When an information recording command is given from the upper controller through the input connector 159, the system controller 150 instructs the servo controller 151 to locate the focal spot on an appropriate position of the optical disk 100. Information to be recorded is converted into an NRZI signal by a signal processing circuit 161. The NRZI signal is further converted into suitable pulse trains by the signal processing circuit 154. When these pulse trains pass through the delay circuit 155, predetermined delays are given to these pulse trains respectively. The delayed pulse trains are transmitted to the current sinks 156.

A constant current source 157 is connected to the semiconductor laser 131. The current sinks 156 are connected to the constant current source 157. Configuration is made so that the total current spent by the semiconductor laser 131 and the current sinks 156 is always constant. Whether the current sinks 156 are operated to absorb the current or not, depends on the signal generated by the signal processing circuit 154 and transmitted through the delay circuit 155. When the current sinks 156 operate, part of the current provided from the constant current source 157 is absorbed to the current sinks 156. As a result, the amount of the current supplied to the semiconductor laser 131 is reduced to thereby change the power level of the energy beam emitted from the semiconductor laser 131. When the current sinks 156 are operated at suitable timing, the signal processing circuit 154 and the delay circuit 155 achieve the recording strategy of the invention shown in FIG. 1. That is, the optical disk recording method described in any one of the first to third embodiments can be achieved by the optical disk device according to this embodiment, so that accurate edge shift correction of next-generation optical disks larger in interference can be made particularly in terms of downward compatibility in which low-speed recording is made on future high-speed recording disks, and that various optical disks different in recording film material or recording mechanism can be used without any change of the fundamental waveform of the recording strategy.

Incidentally, to perform the aforementioned operation, the optical disk device according to this embodiment is supplied with external electric power through a terminal 160.

The optical disk recording method as the fourth embodiment of the invention will be described below.

Figure 10:
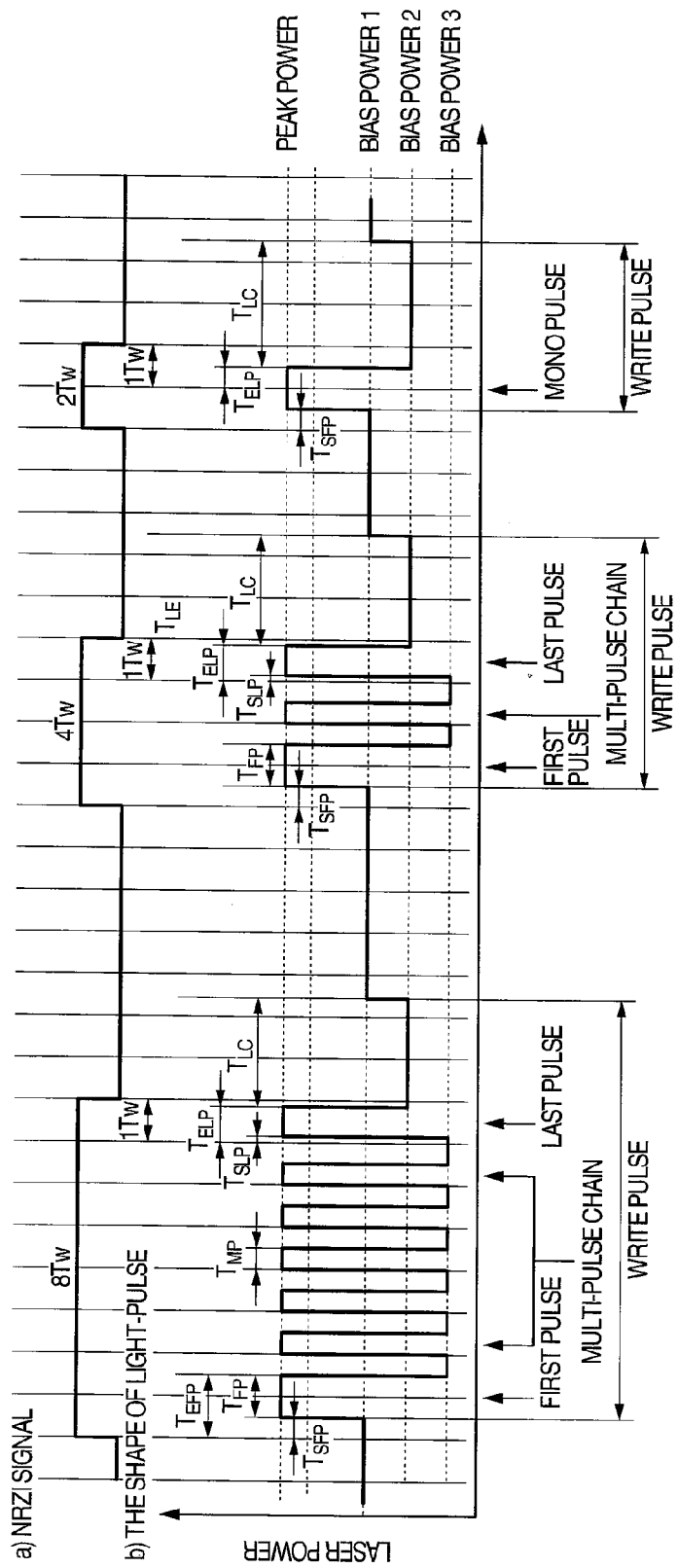
FIG. 10 is a view for explaining a recording strategy in a fourth embodiment of the invention.

Referring to FIG. 10, change with time in power level of the energy beam applied on the recording medium will be described in the case where information converted into RLL (1, 7) as a modulation code is recorded on the recording medium. The way of changing the power level with the passage of time at the time of recording information is generally referred to as "write strategy" or "recording strategy". FIG. 10 shows a recording strategy including the information recording method according to the invention. Specifically, the recording strategy will be described on the case where a phase change medium which is a rewritable medium is taken as an example. In this case, the shortest mark/space length is 2 Tw (twice as large as the time Tw) and the longest mark/space length is generally 8 Tw when Tw is the time width of a reference clock at recording/reproducing.

When an NRZI signal is given as time-series information to be recorded on the recording medium, the NRZI signal is converted into a time-series power level change of the energy beam by a suitable signal processing circuit. The time-series power level change is shown as a light pulse waveform in FIG. 10. Four levels "Write Level", "Bias Level 1", "Bias Level 2" and "Bias Level 3" are set as the power levels. In the "Bias Level 1", the recording medium can be shifted to a first state. In the "Write Level", the recording medium can be shifted to a second state. The "Bias Level 3" is equal to or lower than the "Bias Level 1". When the length of a region of the second state formed in the recording medium is 3 Tw or larger (i.e. the length of the NRZI signal is 3 Tw or larger), a period of the power level "Bias Level 3" is mixed with the irradiation period of the "Write Level" so that the energy beam is provided as a multi-pulse chain. The first light pulse in the multi-pulse chain of the energy beam is referred to as "first pulse". The last light pulse in the multi-pulse chain is referred to as "last pulse". Repeated light pulses reciprocating between the "Write Level" and the "Bias Level 3" are provided between the first pulse and the last pulse in accordance with the length of the NRZI signal. The number of repetitions is (n−3) when the length of the NRZI signal is nTw (n>2). The repeated pulses provided between the first pulse and the last pulse are generically referred to as "comb pulse chain". That is, when a region of the second state corresponding to the NRZI signal having a length of 4 Tw or larger is formed, a recording pulse chain is provided as a combination of the first pulse, the comb pulse chain and the last pulse. When a region of the second state corresponding to the NRZI signal having a length of 3 Tw is formed, a recording pulse chain is provided as a combination of the first pulse and the last pulse. When a region of the second state corresponding to the NRZI signal having a length of 2 Tw is formed, a recording pulse chain is provided as a mono pulse.

The "Bias Level 2" is a power level which is equal to or lower than the "Bias Level 1" and which is equal to or higher than the "Bias Level 3". When the length of a region of the second state is 3 Tw or larger, the power level of the energy beam is kept at the "Bias Level 2" for a predetermined time after the last pulse. When the length of a region of the second state is 2 Tw, the power level of the energy beam is kept at the "Bias Level 2" for a predetermined time after the write light pulse.

There is a possibility that the "Bias Level 2" may be a power level equal to either "Bias Level 1" or "Bias Level 3". There is a possibility that all the "Bias Level 1", "Bias Level 2" and "Bias Level 3" may be quite the same power level. Reference values of the "Write Level", "Bias Level 1", "Bias Level 2" and "Bias Level 3" may be recorded as medium information in suitable positions of the recording medium in advance. The portion in which medium information concerning recording strategy is recorded on the recording medium is referred to as an information track in a control data zone. Reference values of the power levels are read from the information track in the control data zone of the recording medium, so that the power levels at the time of writing data are decided on the basis of the reference values.

In FIG. 10, definition of a recording waveform is conceived in consideration of the case where a region of the second state corresponding to the NRZI signal having a length of 3 Tw or larger is formed. The pulse fall timing of the first pulse in a write pulse train is defined as a time point that TEFP has passed after the rise timing of the NRZI signal. The pulse rise timing of the first pulse is at a time point which is a time period TLFP ahead of the pulse fall time point of the first pulse. The pulse rise timing of the last pulse in the write pulse train is at a time point that a time period TSLP has passed after a reference time point which is 1 Tw ahead of the fall time point of the NRZI signal. The pulse fall timing of the last pulse is at a time point that a time period TLLP has passed after the pulse rise time point of the last pulse.

A comb pulse chain may be provided between the first pulse and the last pulse. The pulse rise timing of each of pulses in the comb pulse chain coincides with a reference clock position. The pulse fall timing of each pulse is at a time point that a time period TTMP has passed after the pulse rise time point of the pulse.

The case where a region of the second state corresponding to the NRZI signal having a length of 2 Tw is formed in the recording medium will be considered. The pulse rise timing of the light pulse is at a time point which is a time period TLFP ahead of a reference time point that TELP has passed after the rise timing of the NRZI signal. The pulse fall timing of the last pulse in the write pulse train, that is, the pulse fall timing of the light pulse is at a time point that a time period TLLP has passed after a second reference time point which is a time point that a time period TSLP has passed after a reference time point which is 2 Tw ahead of the fall time point of the NRZI signal.

A portion having a power level of "Bias Level 2" follows the last pulse in the pulse train of 3 Tw or larger or the recording pulse in the pulse train of 2 Tw. The length of the portion is TLE.

TEFP, TLFP, TSLP, TLLP, TLE and TTMP which are time periods for defining the recording pulse train are decided on the basis of information concerning the recording method, the information recording medium and the standard information recording apparatus, which is read from the information track in the control data zone of the recording medium.

Description has been made on the case where a phase change medium is taken as an example. That is, the first recording state or the second recording state corresponds to either crystalline state or non-crystalline state. There is exhibited overwrite characteristic in which the mark is erased by the "Bias Power 2". In a recordable medium, the temperature of the recording film is increased by the "Peak Power" to change the optical characteristic of the recording film. Accordingly, even in the case where the recording film is irradiated with an energy beam of "Bias Power" after the optical characteristic of the recording film has been once changed, the mark cannot be erased. Even in the recordable medium, it is however possible to improve recording characteristic when a non-recordable "Bias Power" level is used. That is, when recording is to be made at a high speed, there is a possibility that the temperature of the recording film cannot be increased by irradiation with an energy beam of the "Peak Power" level. Particularly, when the output of the laser power is limited, the "Peak Power" is limited. In this case, when preheat is given by the "Bias Power" before recording in order to assist the temperature rise at the time of recording, recording can be made easily. Accordingly, even in the recordable medium, the waveform with the "Bias Power" shown in FIG. 10 can be used as recording strategy.

TEFP, TLFP, TSLP, TLLP, TLE and TTMP which are time periods for defining the recording pulse train are not always constant. It is necessary to change these time periods in accordance with a combination of NRZI signals. In the case of high-density recording, it is difficult to perform always stable recording because thermal interference between adjacent marks becomes large. It is therefore conceived that the recording waveform is changed adaptively in accordance with the combination of NRZI signals. This measure is particularly effective on the recordable medium having characteristic in which the medium is easily affected by thermal interference.

To correct the front edge shift, either TEFP or TLFP is changed. The amounts of change from the reference values of TEFP and TLFP are referred to as ΔTEFP and ΔTLFP respectively. To correct the rear edge shift, either TSLP or TLLP is changed. The amounts of change from the reference values of TSLP and TLLP are referred to as ΔTSLP and ΔTLLP respectively.

A first look-up table of TMF concerning the front edge is defined. On the first look-up table, values decided by combinations of M(n) and S(n−1) are arranged when M(n) is the length of a mark to be currently recorded, and S(n−1) is the length of a preamble space preceding the mark. The values may be positive or negative. Then, a second look-up table of TML concerning the rear edge shift is defined. On the second look-up table, values decided by combinations of M(n) and S(n+1) are arranged when M(n) is the length of the mark to be currently recorded, and S(n+1) is the length of a following space following the mark. The values may be positive or negative.

In case 1, the value of TMF is made coincident with the value of ΔTLFP, and the value of TML is made coincident with the value of ΔTLLP. In this case, the value of TLFP and the value of TLLP are changed in accordance with the combination of NRZI signals. That is, the pulse rise position of the first pulse is changed while the pulse fall position of the first pulse is fixed. Further, the pulse fall position of the last pulse is changed while the pulse rise position of the last pulse is fixed.

In case 2, the value of TMF is made coincident with the value of ΔTEFP, and the value of TML is made coincident with the value of ΔTLLP. In this case, the value of TEFP and the value of TLLP are changed in accordance with the combination of NRZI signals. That is, both pulse rise position and pulse fall position of the first pulse are changed simultaneously. Further, the pulse fall position of the last pulse is changed while the pulse rise position of the last pulse is fixed.

In case 3, the value of TMF is made coincident with the value of ΔTLFP, and the value of TML is made coincident with the value of ΔTSLP. In this case, the value of TLFP and the value of TSLP are changed in accordance with the combination of NRZI signals. That is, the pulse rise position of the first pulse is changed while the pulse fall position of the first pulse is fixed. Further, both pulse rise position and pulse fall position of the last pulse are changed simultaneously.

In case 4, the value of TMF is made coincident with the value of ΔTEFP, and the value of TML is made coincident with the value of ΔTSLP. In this case, the value of TEFP and the value of TSLP are changed in accordance with the combination of NRZI signals. That is, both pulse rise position and pulse fall position of the first pulse are changed simultaneously. Further, both pulse rise position and pulse fall position of the last pulse are changed simultaneously.

In case 5, the value of TMF is made coincident with the value of ΔTLFP. In this case, the value of TLFP is changed in accordance with the combination of NRZI signals. That is, the pulse rise position of the first pulse is changed while the pulse fall position of the first pulse is fixed.

In case 6, the value of TMF is made coincident with the value of ΔTEFP. In this case, the value of TEFP is changed in accordance with the combination of NRZI signals. That is, both pulse rise position and pulse fall position of the first pulse are changed simultaneously.

In case 7, the value of TML is made coincident with the value of ΔTLLP. In this case, the value of TLLP is changed in accordance with the combination of NRZI signals. That is, the pulse fall position of the last pulse is changed while the pulse rise position of the last pulse is fixed.

In case 8, the value of TML is made coincident with the value of ΔTSLP. In this case, the value of TSLP is changed in accordance with the combination of NRZI signals. That is, both pulse rise position and pulse fall position of the last pulse are changed simultaneously.

Information for selection of values from the values contained in the first and second look-up tables and selection of one case from the cases 1 to 8 is decided when information written in the information track in the control data zone of the recording medium is read.

As described above, when adaptive waveform change using the look-up tables is classified into cases 1 to 8 so that one case can be selected from the cases 1 to 8, there is an effect that a method adapted to various recording media different in characteristic can be provided so that information can be recorded always stably with good compatibility.

In this embodiment, in the definition of the first look-up table, M(n) is classified into four cases and S(n−1) is classified into four cases, that is, the first look-up table has a 4×4 size in total. In the definition of the second look-up table, M(n) is classified into four cases and S(n+1) is classified into four cases, that is, the second look-up table has a 4×4 size in total. The size of each look-up table is not limited to 4×4. The effect of the invention can be obtained as long as the size of the look-up table is not 1×1.

This write strategy has characteristic that recording can be made at a current linear velocity based on this write strategy even in the case where a recordable high-speed medium will be developed in the future. That is, the recordable high-speed medium cannot but have a heat storage structure to restrain the recording power from being increased by the high speed. Accordingly, when recording is to be made at a low speed, heat is stored in the recordable high-speed recording medium so that the amount of thermal interference becomes large. Therefore, when the strategy of the invention for suppressing thermal interference is used, the high-speed medium which will be developed in the future can be used in low-speed recording so that downward compatibility can be kept good.

Figure 11:
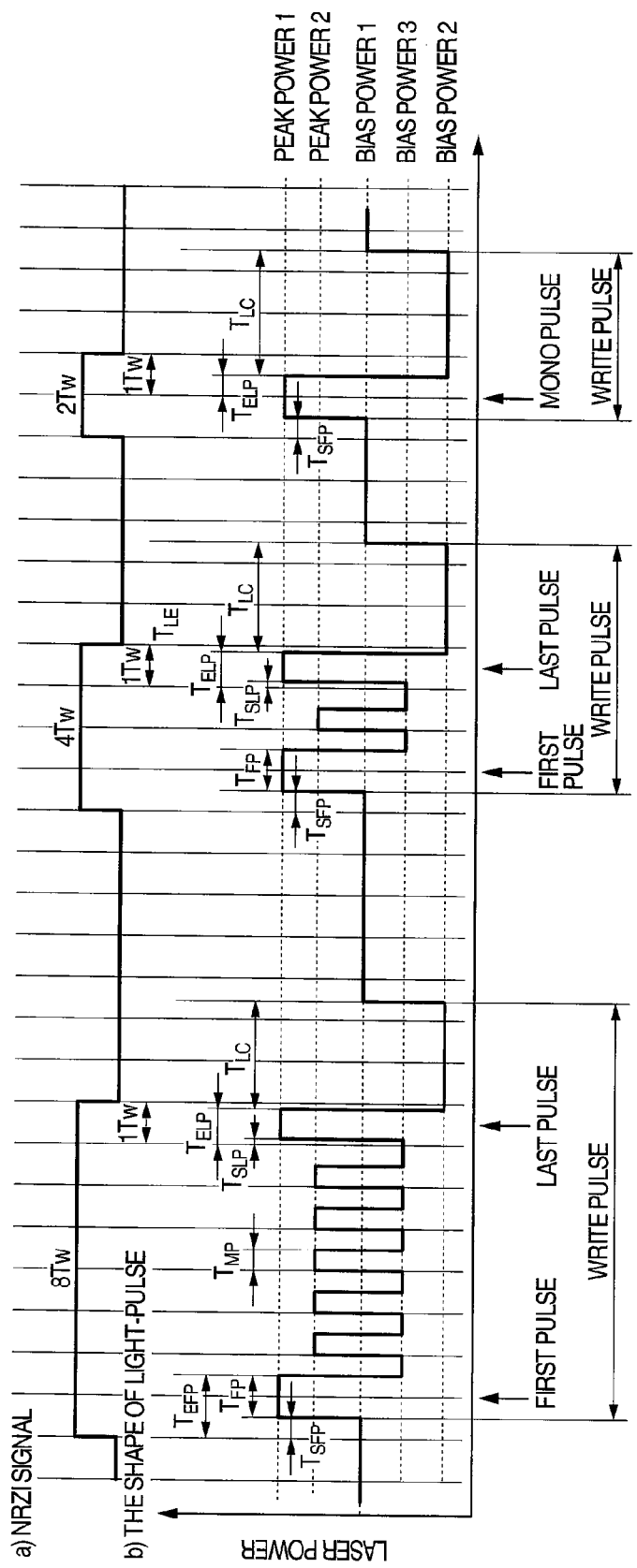
FIG. 11 is a view for explaining another recording strategy in the fourth embodiment of the invention.

If the write strategy currently discussed can be used for the high-speed medium which will be developed in the future when only numerical values of parameters are changed without any change of the fundamental shape of the write strategy, it is unnecessary to provide a plurality of circuits each for reading strategy and parameters written in the control information area of each disk in accordance with generation and generating a waveform from the NRZT to the laser drive circuit. Particularly, in a constant angular velocity (CAV) method in which information is recorded/reproduced at a constant rotational velocity, the linear velocity varies according to the radial position. It is therefore necessary to use one and the same fundamental strategy on the whole surface of the disk in order to set parameters smoothly in accordance with the radius. When the velocity becomes high, the rise and fall characteristic of the laser drive circuit is limited. For this reason, in the strategy shown in FIG. 10, the waveform of $T_{MP}$ in the multi-pulse chain changes from a rectangular wave shape to a triangular wave shape, so that irradiation energy becomes insufficient in this portion. As a method to compensate for the shortage of irradiation energy, as shown in FIG. 11, there is provided a method in which the "Bias Power 3" level is increased to compensate for the shortage of irradiation energy. A setting table of "Bias Power 3" is provided in accordance with the radius so that controlling is performed. Values of linear velocity are recorded in the control information area of the disk in advance. When the numerical values are used for interpolation, the table can be generated. In this method, there is a possibility that the optimum value of "Bias Power 3" will be displaced if the characteristic of the laser drive circuit varies according to the apparatus. It is therefore necessary to search for the optimum value of bias power in a test write region at the time of insertion of the disk.

In another method to compensate for the shortage of irradiation energy caused by the rise and fall characteristic of the laser drive circuit, as shown in FIG. 11, the peak power level in the multi-pulse chain is set as a level "Peak Power 2" different from the level of the first and last pulses so that the level "Peak Power 2" cooperates with the level "Bias Power 3" in accordance with the linear velocity in the same manner as in the aforementioned strategy. In this case, the power level of the first and last pulses is provided as "Peak Power 1" distinguished from "Peak Power 2". When "Peak Power 2" and "Bias Power 3" are set, the average power level of the multi-pulse chain portion can be controlled. Since the difference between "Peak Power 2" and "Bias Power 3" can be set to be small, the influence of variation in the rise and fall characteristic of the laser drive circuit can be reduced. When the linear velocity becomes further high, the values of "Peak Power 2" and "Bias Power 3" are set to be equal to each other and changed in accordance with the linear velocity in order to eliminate the influence of variation in the characteristic. According to this method, information can be recorded accurately when parameters ranging from a high velocity to a low velocity are set without any change of the fundamental shape of the write strategy. Also in this case, the aforementioned strategy for changing the positions of the first and last pulses in accordance with the preamble and following space lengths and the disk's own mark length has an effect particularly on low-velocity recording.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk recording method used for an optical disk having a recording film capable of being changed to an optically different state by irradiation with an energy beam to thereby record information, said method being provided for recording information as a recording mark length and preceding and following space lengths in said optically different state by irradiating said recording film with a multi-pulse chain of said energy beam having at least two emission power levels each having an emission time changed in accordance with said optical disk there is relative movement between said energy beam and a surface of said recording film of said optical disk, the method comprising the steps of:

recording information on the optical disk with the multi-pulse chain using setting-values; and changing a position and a width of a first pulse in the multi-pulse chain on the basis of a first table and a second table, wherein:

the setting-values concerning the multi-pulse chain for predetermined recording velocity are expressed as a sum of a linear term and a nonlinear term, and coefficients of the linear term and the nonlinear term are expressed as integers respectively, the first table has coefficients of the linear term for the predetermined recording velocity and is designed to specify the position of the first pulse, and the coefficients in the first table are defined based on recording mark length and preceding space length, the second table has coefficients of the linear term and the nonlinear term for the predetermined recording velocity and is designed to specify the width of the first pulse, and the coefficients in the second table are defined based on recording mark length and preceding space length, all coefficients corresponding to respective ones of the preceding space lengths are same values respectively for recording mark lengths equal to or greater than a predetermined length on each first and second table, and all coefficients corresponding to respective ones of the recording mark lengths are same values respectively for preceding space lengths equal to or greater than a predetermined length on each first and second table.

2. An optical disk device comprising:

an energy beam generator, a power adjusting unit by which emission power of an energy beam generated by said energy beam generator can be set to have at least two predetermined power levels, a holding mechanism for holding an optical disk having a recording film capable of being changed to an optically different state by irradiation with said energy beam having said predetermined power levels to thereby record information, a moving unit by which relative movement is provided between said energy beam and a surface of said recording film of said optical disk, and a conversion unit for converting information to be recorded into a power level change of said energy beam, said optical disk device being provided for recording information as a recording mark length and preceding and following space lengths in said optically different state by irradiating said recording film with a multi-pulse chain of said energy beam having said power levels each having an emission time changed in accordance with said optical disk while operating said moving unit, wherein:

said optical disk device further comprises a storage unit;

said storage unit stores setting-values concerning the multi-pulse chain for predetermined recording velocity, the setting-values are expressed as a sum of a linear term and a nonlinear term, and coefficients of the linear term and the nonlinear term are expressed as integers respectively, said storage unit further includes a first table and a second table for changing a position and a width of a first pulse in the multi-pulse chain;

the first table has coefficients of the linear term for the predetermined recording velocity and is designed to specify the position of the first pulse, and the coefficients in the first table are defined based on recording mark length and preceding space length, the second table has coefficients of the linear term and the nonlinear term for the predetermined recording velocity and is designed to specify the width of the first pulse, and the coefficients in the second table are defined based on recording mark length and preceding space length, said power adjusting unit performs emission pulse timing control referring to said first and second tables, all coefficients corresponding to respective ones of the preceding space lengths are same values respectively for recording mark lengths equal to or greater than a predetermined length on each first and second table, and all coefficients corresponding to respective ones of the recording mark lengths are same values respectively for preceding space lengths equal to or greater than a predetermined length on each first and second table.

3. An optical disk having a recording film capable of being changed to an optically different state by irradiation with a multi-pulse chain of an energy beam having at least two emission power levels to thereby record information as a recording mark length and preceding and following space lengths, the optical disk comprising:

setting-values concerning the multi-pulse chain for predetermined recording velocity, a first table designed to specify a position of a first pulse of a multi-pulse chain, and a second table designed to specify the width of the first pulse, wherein:

the setting-values are expressed as a sum of a linear term and a nonlinear term, and coefficients of the linear term and the nonlinear term are expressed as integers respectively, the first table has coefficients of the linear term for the predetermined recording velocity, and the coefficients in the first table are defined based on recording mark length and preceding space length, and the second table has coefficients of the linear term and the nonlinear term for the predetermined recording velocity, and the coefficients in the second table are defined based on recording mark length and preceding space length, all coefficients corresponding to respective ones of the preceding space lengths are same values respectively for recording mark lengths equal to or greater than a predetermined length on each first and second table, and all coefficients corresponding to respective ones of the recording mark lengths are same values respectively if the preceding space lengths equal to or greater than a predetermined length on each first and second table.

* * * * *